United States Patent
Gonzalez Martin et al.

(10) Patent No.: US 12,528,251 B2
(45) Date of Patent: Jan. 20, 2026

(54) METHOD OF PRINTING THREE DIMENSIONAL OBJECTS

(71) Applicant: Peridot Print LLC, Palo Alto, CA (US)

(72) Inventors: Sergio Gonzalez Martin, Sant Cugat del Valles (ES); Ismael Fernandez Aymerich, Sant Cugat del Valles (ES); Manuel Freire Garcia, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 278 days.

(21) Appl. No.: 17/309,887

(22) PCT Filed: Apr. 29, 2019

(86) PCT No.: PCT/US2019/029625
§ 371 (c)(1),
(2) Date: Jun. 28, 2021

(87) PCT Pub. No.: WO2020/222738
PCT Pub. Date: Nov. 5, 2020

(65) Prior Publication Data
US 2022/0040928 A1    Feb. 10, 2022

(51) Int. Cl.
*B29C 64/393*    (2017.01)
*B29C 64/182*    (2017.01)
(Continued)

(52) U.S. Cl.
CPC .......... *B29C 64/393* (2017.08); *B29C 64/182* (2017.08); *B33Y 10/00* (2014.12); *B33Y 50/02* (2014.12)

(58) Field of Classification Search
CPC ... B29C 64/393; B29C 64/171; B29C 64/176; B29C 64/182; B29C 64/165;
(Continued)

(56) References Cited

U.S. PATENT DOCUMENTS 9,636,871 B2    5/2017 Butler et al.
2017/0052531 A1    2/2017 Minardi et al.
(Continued)

FOREIGN PATENT DOCUMENTS

CN    105988741 A    10/2016
WO    WO-2013113372 A1    8/2013
(Continued)

OTHER PUBLICATIONS

Simply 3D, Multi-Part Printing, Jan. 2018 (6 pages).
Ultimaker, Mastering Cura, Jul. 2018 (28 pages).

*Primary Examiner* — Susan D Leong
*Assistant Examiner* — Jonathan B Woo
(74) *Attorney, Agent, or Firm* — Michael Dryja

(57) ABSTRACT

A method is described in which data representing a plurality of three-dimensional objects to be printed in a printing job is received and printer control data is generated based on an attribute to be prioritised for each object. The plurality of three-dimensional objects are printed in one printing job by printing a plurality of successive layers based on the generated printer control data. Printing a layer comprising printing a portion of a first object in a first print mode, wherein a first attribute is prioritised, and printing a portion of a second object in a second print mode, wherein a second attribute is prioritised.

19 Claims, 3 Drawing Sheets

(51) Int. Cl.
*B33Y 10/00* (2015.01)
*B33Y 50/02* (2015.01)

(58) Field of Classification Search
CPC ......... B29C 64/00; B33Y 10/00; B33Y 50/00; B33Y 50/02; B33Y 30/00
See application file for complete search history.

(56) References Cited

U.S. PATENT DOCUMENTS

| | | | |
|---|---|---|---|
| 2017/0329309 A1 | 11/2017 | Valade | |
| 2018/0032059 A1* | 2/2018 | Morovic | ............... B29C 64/386 |
| 2018/0134028 A1 | 5/2018 | Morovic et al. | |
| 2019/0152156 A1* | 5/2019 | Morovic | ............... B29C 64/393 |

FOREIGN PATENT DOCUMENTS

| | | | | |
|---|---|---|---|---|
| WO | WO-2016169618 A1 * | 10/2016 | ............ | B33Y 50/00 |
| WO | WO-2017074413 A1 * | 5/2017 | ........... | B29C 64/386 |
| WO | WO-2017134672 A2 * | 8/2017 | ............ | B33Y 70/00 |
| WO | WO-2017134676 A1 * | 8/2017 | ............ | B33Y 70/00 |
| WO | WO-2018/017101 | 1/2018 | | |
| WO | WO-2018017101 A1 * | 1/2018 | ............ | B29C 64/00 |
| WO | WO-2018/140033 | 8/2018 | | |
| WO | WO-2018194540 A1 * | 10/2018 | .............. | B22F 12/13 |
| WO | WO-2018199960 A1 * | 11/2018 | ........... | B29C 64/393 |
| WO | WO-2019/005708 A2 | 1/2019 | | |
| WO | WO-2019/008355 | 1/2019 | | |

* cited by examiner

METHOD OF PRINTING THREE DIMENSIONAL OBJECTS

BACKGROUND

A three dimensional printer may generate a three dimensional object by printing a series of two-dimensional layers on top of one another. In some three-dimensional printing systems, each layer of an object may be formed by placing a uniform layer of powder in the printer's build bed, and then placing liquid printing agents at the specific points at which it is desired to solidify the powder to form the layer of the object. In some systems, energy may be applied to each layer of powder to cause the powder to solidify in accordance with where printing agents were applied.

Before the object is printed, it is possible to select a printing mode, so that a particular attribute of the printed object is prioritised.

DETAILED DESCRIPTION

In three-dimensional printing, also referred to as additive manufacturing, one or more three-dimensional objects may be generated by solidifying a build material, which may be a powder. A fusing agent may be distributed over a layer of the powder in a predetermined pattern. Heat may be applied to the layer of powder such that portions of the layer on which fusing agent is applied heat up, coalesce, and then solidify upon cooling, thereby forming a layer of the object. Portions of the layer of powder on which no fusing agent is applied do not heat sufficiently to coalesce and solidify. The pattern in which the fusing agent is applied to the layer of powder may be determined from printer control data generated from data representing the three-dimensional object.

It is possible to print a plurality of objects in one printing job, and it is possible to select a printing mode for a printing job, so that all the objects printed in the printing job are printed with a particular attribute being prioritised.

Examples described herein allow different objects within a printing job to be printed with different attributes being prioritised. As described below, this may be achieved by independently processing the different objects having different attributes to be prioritised.

Figure 1:
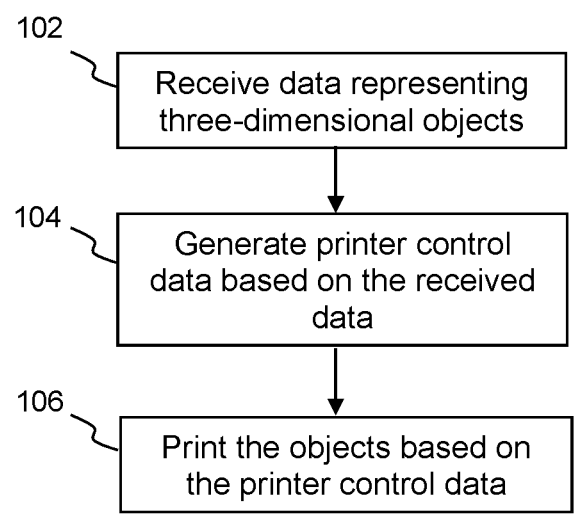
FIG. 1 is a flow chart of an example printing method.

FIG. 1 is a flowchart of an example method for printing different objects within a printing job. The method comprises, in block 102, receiving data representing a plurality of three-dimensional objects to be printed in a printing job, wherein an attribute to be prioritised is associated with each of the objects. The printer may comprise a communication interface configured to receive the data representing the objects.

In one example, before the data representing the plurality of objects is sent to a printer, a user may select a desired attribute to take priority over other attributes for each of the plurality of objects within the printing job. A user may select that for a first object, a first attribute is prioritised, for a second object a second attribute is prioritised, and so on. More than one object in the printing job may have the same assigned priority-taking attribute.

For example, a user may select that for a first object, dimensional accuracy is prioritised; for a second object, a mechanical property is prioritised; for a third object a characteristic of the finish, for example the appearance or the texture, is prioritised; and for a fourth object, the speed of printing is prioritised.

A data file, such as a 3MF file, may be generated, wherein the data file comprises the representation of the plurality of three-dimensional objects in the printing job. The plurality of objects may be of different shapes and sizes. The data file may comprise information indicating the prioritised attribute that is assigned to each object in the printing job. The information indicating the prioritised attribute may be metadata embedded in the data file. The data file may be generated in pre-print software, prior to the data file being received by the printer.

In another example, the user may select the desired attribute to take priority over other attributes after the data representing the plurality of objects is sent to the printer. The printer may comprise a user interface for receiving a user input to select the desired attribute to take priority over other attributes for each of the plurality of objects within the printing job.

The method comprises, in block 104, generating printer control data based on the received data representing the objects. The printer may comprise a processor for generating the printer control data based on the received data file. An example processing method for generating the printer control data is shown in the flowchart in FIG. 2 and described in further detail later below.

The generated printer control data may comprise instructions to process printing agents according to each of the prioritised attributes that are assigned to the objects in the printing job. Printer control data may be generated differently according to the attribute that is to be prioritised.

Block 106 comprises printing the plurality of three-dimensional objects in a printing job. Printing the plurality of three-dimensional objects may comprise printing a plurality of successive layers based on the printer control data. The plurality of successive layers may all be of the same thickness or may be of different thicknesses. Printing the plurality of successive layers may comprise forming a layer of powdered build material on a build platform of the printer, applying printing agents onto the layer of build material in a predetermined pattern based on the printer control data, and applying energy to the layer. Applying printing agents onto the layer may comprise applying a fusing agent to regions of the build material that are to be part of the printed object. Applying printing agents onto the layer may comprise applying a detailing agent to regions adjacent the edges of the object to be printed, outside the object to be printed. Applying energy to the layer may cause the parts of the built material on which fusing agent is applied to heat up, coalesce and then solidify upon cooling, to form a layer of the three-dimensional objects.

Printing a layer of the plurality of successive layers may comprise printing a first portion of a first object of the plurality of objects and printing a first portion of a second object of the plurality of objects in the same layer, wherein the first object is printed in a first print mode in which a first attribute is prioritised, and the second object is printed in a second mode in which a second attribute is prioritised.

Printing the first portion of the first object may comprise applying printing agents onto a region of the build material based on the printer control data for the first attribute.

Printing the first portion of the second object may comprise applying printing agents based on the printer control data for the second attribute.

Applying the printing agents based on the printer control data may comprise setting a composition of the printing agents to be placed at a given location on the build material corresponding to a voxel location of the object. The composition of the printing agents may be set according to the prioritised attribute. The composition of the printing agents to be placed at a given location on the build material may comprise a combination of different printing agents.

The printing agents may include a fusing agent. The printing agents may include a detailing agent. Applying the printing agents based on the printer control data may comprise determining a ratio of fusing agent and detailing agent to be applied at a given location on the build material corresponding to a voxel location. Applying the printing agents based on the printer control data may comprise introducing a modifying agent to the printing agents composition to be placed at a given location on the build material corresponding to a voxel location according to the prioritised attribute.

In printing objects with the dimensional accuracy to be prioritised, the printing agents composition applied on the edges of the object may have a higher amount of fusing agent than the composition of printing agents applied to regions of the object away from the edges of the object. The amount of detailing agent provided outside of the object may be higher than for objects in which the dimensional accuracy is not prioritised. This may provide edges of the objects having more definition. Maximising the dimensional accuracy may comprise having more control over the printing agents without taking into account mechanical properties. Maximising the dimensional accuracy may comprise implementing internal structures within the printed object.

In printing objects having mechanical properties prioritised, the composition of printing agents applied to the inside of the object may have a lower amount of detailing agent. The amount of detailing agent used outside the object may be increased. In prioritising mechanical properties, dimensional accuracy may be compromised.

In printing objects having the appearance and/or texture prioritised, the composition of the printing agents may be adjusted such that the amount of detailing agent used inside the object is increased. Internal structures may be implemented to improve the appearance and or texture of the printed object.

Other attributes that may be associated with a printing part may include transparency or conductivity. This may be achieved by including different printing agents in the printing agents composition.

Figure 2:
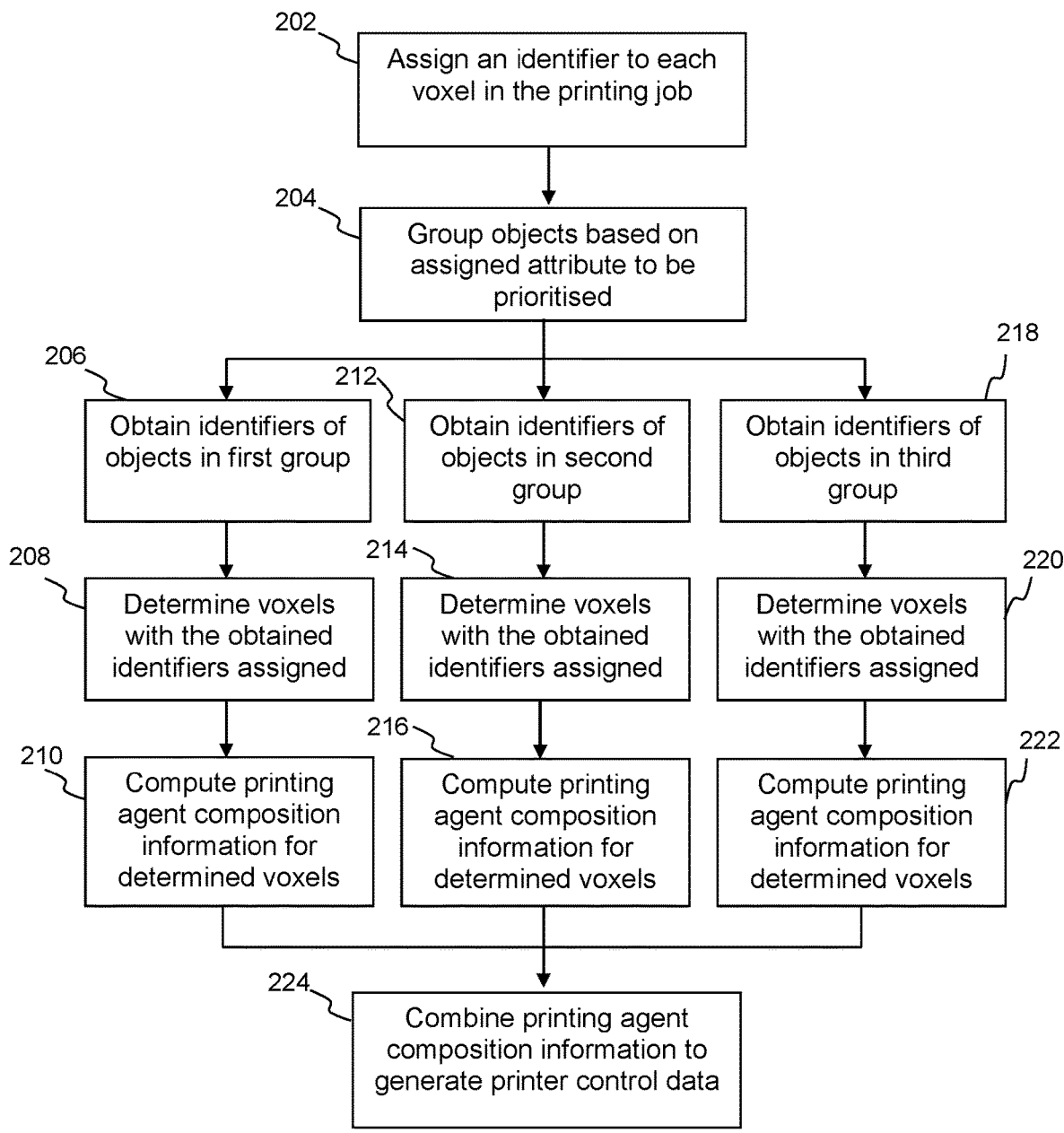
FIG. 2 is a flow chart of an example processing method.

FIG. 2 illustrates an example processing method for generating the printer control data.

In block 202, an identifier is assigned to each voxel in the printing job. The identifier may indicate to which object each voxel of the three-dimensional object belongs. A voxel is a three-dimensional pixel. In some examples, each voxel may have the same size and shape, whereas in other examples, the different voxels may have different sizes and/or shapes.

In block 204, the plurality of objects in the printing job are grouped into groups based on the priority-taking attribute assigned to the objects. Each object within a group may have the same assigned priority-taking attribute.

In blocks 206-222, the groups of objects are processed independently and in parallel. In the example processing method shown in FIG. 2, three different attributes that are prioritised across the plurality of objects and so there are three groups of objects that are processed in parallel. In other examples methods, there may be more or fewer different attributes, and so there may be more or fewer groups of objects.

In block 206, the identifiers that identify the objects in the first group are obtained. In block 208, the voxels which belong to the objects in the first group are determined based on the obtained identifiers. In block 210, the composition of the printing agent is computed for each of the determined voxels, based on the attribute that is to be prioritised in the first group of objects.

In block 212, the identifiers that identify the objects in the second group are obtained. In block 214, the voxels which belong to the objects in the second group are determined based on the obtained identifiers and in block 216, the composition of the printing agents is computed for each of the determined voxels, based on the attribute that is to be prioritised in the second group of objects. Similarly, in blocks 218, the identifiers that identify the objects in the third group are obtained; in block 220, the voxels that belong to the objects in the third group are determined based on the obtained identifiers; and in block 222, the composition of the printing agents is computed for each of the determined voxels, based on the attribute that is to be prioritised in the second group of objects.

In block 224, the computed composition information for all voxels in all groups of objects is combined to generate the printer control data.

Generating the printer control data may comprise combining the computed composition information for all voxels with other information regarding the voxels. For example, the information regarding the voxels may comprise at least one of information defining the distance from a voxel to the closest surface voxel in a first plane; information defining the distance from a voxel to the closest surface voxel in a first direction in a second plane, perpendicular to the first plane; information defining the distance from a voxel to the closest surface voxel in a second direction in the second plane, the second direction opposite to the first direction; information defining the distance from a voxel to the closest surface voxel in any plane.

Generating the printer control data may comprise computing half-tone values for the printing agents for all voxels in the objects.

Figure 3:
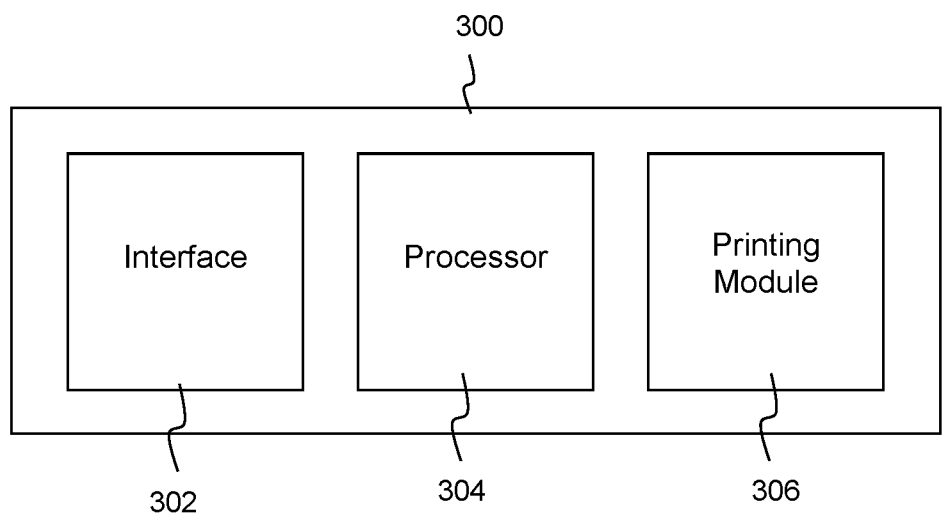
FIG. 3 is a block diagram of an example three-dimensional printer.

FIG. 3 shows a block diagram of an example three-dimensional printer 300 for generating a printing job comprising a plurality of three-dimensional objects. The three-dimensional printer may be configured to perform the example method described in FIG. 1. The printer comprises a communication interface 302 for receiving data representing the plurality of three-dimensional objects. The printer comprises a processor 304 to interpret the received data and generate the print control data. The processor may be configured to carry out the example method shown in FIG. 2. The three-dimensional printer comprises a printing module 306. The printing module may comprise a print mechanism and may be configured to print the plurality of three-dimensional objects using the generated print control data.

The print mechanism may comprise a build platform. The print mechanism may comprise a build material distributor, for providing successive layers of build material. The build material distributor may be configured to deliver or deposit layers of the build material onto the build platform. The print mechanism may comprise a printing agent distributor to selectively deliver printing agent onto a layer of built material according to the print control data. The printing agent distributor may be a printhead, for example a thermal or piezo printhead. The printhead may comprise a nozzle, for example an array of nozzles, for distributing the printing agents onto the layer of build material. The print mechanism may further comprise an energy source. The energy source may be configured to emit energy, for example infra-red radiation, to be absorbed by the printing agent.

Figure 4:
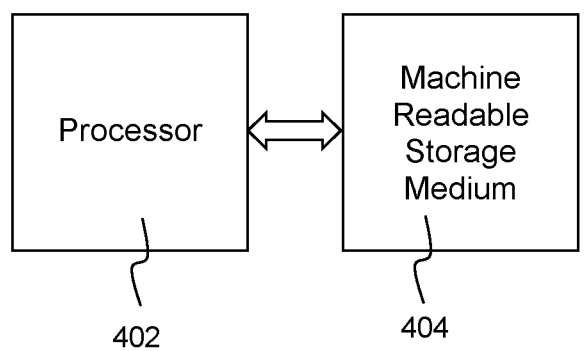
FIG. 4 is an example of a machine readable medium in association with a processor.

Various elements and features of the methods described herein may be implemented through the execution of machine-readable instructions by a processor. FIG. 4 shows a processing system comprising a processor 402 in association with a non-transitory machine-readable storage medium 404. The machine-readable storage medium may be a tangible storage medium such as a removable storage unit or a hard disk installed in a hard disk drive. The machine-readable storage medium 404 comprises instructions to compute compositions of printing agents of a plurality of three-dimensional objects of a printing job, each of the plurality of objects having an associated attribute that is to be prioritised in the printing process, and instructions to print a layer of the printing job, the layer comprising portions of the three-dimensional objects, wherein the portions are printed in different print modes in which different attributes are prioritised.

The machine-readable storage medium 404 may comprise instructions to generate a composition of printing agents for each voxel within each object.

According to the examples describe herein, the user may print different objects that prioritise different attributes within the same printing job. The processing method may be optimised because print control data may be processed in parallel for the plurality of different attributes to be priorities, the different processing pipelines being independent. The processing method may thereby be optimised.

The invention claimed is:

1. A method comprising:
 receiving, by a processor, data representing a plurality of three-dimensional objects to be printed in a single printing job by an additive manufacturing apparatus;
 determining, by the processor and for each object in the plurality of the three-dimensional objects, an attribute to be prioritized when the respective object is printed, wherein the attribute is one of a plurality of different attributes;
 grouping, by the processor, the objects into a plurality of groups respectively corresponding to the different attributes;
 for each group and by the processor:
  determining voxels of the objects belonging to the respective group;
  determining a print agent composition for the voxels according to the attribute to which the respective group corresponds;
 generating, by the processor, printer control data in which the print agent composition for the voxels of each group is combined; and
 causing, by the processor, the additive manufacturing apparatus to print the objects in the single printing job in accordance with the printer control data that has been generated, such that:
  each voxel is printed using the print agent composition generated for the respective voxel according to the attribute to which the group including the respective voxel corresponds, and
  for each object, the attribute identified for the respective object is prioritized in the printed respective object.

2. The method of claim 1, wherein the received data includes information indicating, for each object, the attribute to be prioritized for the respective object, and
 wherein, for each object, the attribute to be prioritized is preselected.

3. The method of claim 1, wherein the plurality of attributes comprises dimensional accuracy, print speed, texture, and appearance.

4. The method of claim 1, further comprising, for each group and by the processor:
 assigning an identifier to each voxel of each object belonging to the respective group,
 wherein, for each voxel, the identifier defines the object to which the respective voxel belongs.

5. The method of claim 4, further comprising, for each group and by the processor:
 obtaining the identifiers of the objects belonging to the respective group,
 wherein determining the voxels of the objects belonging to the respective group comprises determining the voxels to which the identifiers of the objects belonging to the respective group have been assigned.

6. The method of claim 1, wherein the causing the additive manufacturing apparatus to print the objects comprises:
 causing the additive manufacturing apparatus to apply, for each voxel, printing agents in accordance with the print agent composition that has been determined for the respective voxel.

7. A non-transitory computer-readable data storage medium storing instructions executable by a processor to perform processing comprising:
 receiving data representing a plurality of three-dimensional objects to be printed in a single printing job by an additive manufacturing apparatus;
 determining, for each object in the plurality of the three-dimensional objects, an attribute to be prioritized when the respective object is printed, wherein the attribute is one of a plurality of different attributes;
 grouping the objects into a plurality of groups respectively corresponding to the different attributes;
 for each group:
  determining voxels of the objects belonging to the respective group;
  determining a print agent composition for the voxels according to the attribute to which the respective group corresponds;
 generating printer control data in which the print agent composition for the voxels of each group is combined; and
 causing the additive manufacturing apparatus to print the objects in the single printing job in accordance with the printer control data that has been generated, such that:
  each voxel is printed using the print agent composition generated for the respective voxel according to the attribute to which the group including the respective voxel corresponds, and
  for each object, the attribute identified for the respective object is prioritized in the printed respective object.

8. The non-transitory medium of claim 7, wherein the received data includes information indicating, for each object, the attribute to be prioritized for the respective object, and
 wherein, for each object, the attribute to be prioritized is preselected.

9. The non-transitory medium of claim 7, wherein the plurality of attributes comprises dimensional accuracy, print speed, texture, and appearance.

10. The non-transitory medium of claim 7, wherein the processing further comprises, for each group:
assigning an identifier to each voxel of each object belonging to the respective group,
wherein, for each voxel, the identifier defines the object to which the respective voxel belongs.

11. The non-transitory medium of claim 10, wherein the processing further comprises, for each group:
obtaining the identifiers of the objects belonging to the respective group,
wherein determining the voxels of the objects belonging to the respective group comprises determining the voxels to which the identifiers of the objects belonging to the respective group have been assigned.

12. The non-transitory medium of claim 7, wherein the causing the additive manufacturing apparatus to print the objects comprises:
causing the additive manufacturing apparatus to apply, for each voxel, printing agents in accordance with the print agent composition that has been determined for the respective voxel.

13. A system comprising:
a processor; and
a memory storing instructions executable by the processor to perform processing comprising:
receiving data representing a plurality of three-dimensional objects to be printed in a single printing job by an additive manufacturing apparatus;
determining, for each object in the plurality of the three-dimensional objects, an attribute to be prioritized when the respective object is printed, wherein the attribute is one of a plurality of different attributes;
grouping the objects into a plurality of groups respectively corresponding to the different attributes;
for each group:
determining voxels of the objects belonging to the respective group;
determining a print agent composition for the voxels according to the attribute to which the respective group corresponds;
generating printer control data in which the print agent composition for the voxels of each group is combined; and
causing the additive manufacturing apparatus to print the objects in the single printing job in accordance with the printer control data that has been generated, such that:
each voxel is printed using the print agent composition generated for the respective voxel according to the attribute to which the group including the respective voxel corresponds, and
for each object, the attribute identified for the respective object is prioritized in the printed respective object.

14. The system of claim 13, wherein the received data includes information indicating, for each object, the attribute to be prioritized for the respective object, and
wherein, for each object, the attribute to be prioritized is preselected.

15. The system of claim 13, wherein the plurality of attributes comprises dimensional accuracy, print speed, texture, and appearance.

16. The system of claim 13, wherein the processing further comprises, for each group:
assigning an identifier to each voxel of each object belonging to the respective group,
wherein, for each voxel, the identifier defines the object to which the respective voxel belongs.

17. The system of claim 16, wherein the processing further comprises, for each group:
obtaining the identifiers of the objects belonging to the respective group,
wherein determining the voxels of the objects belonging to the respective group comprises determining the voxels to which the identifiers of the objects belonging to the respective group have been assigned.

18. The system of claim 13, wherein the causing the additive manufacturing apparatus to print the objects comprises:
causing the additive manufacturing apparatus to apply, for each voxel, printing agents in accordance with the print agent composition that has been determined for the respective voxel.

19. The system of claim 13, further comprising the additive manufacturing apparatus.

* * * * *